United States Patent Office 2,918,500
Patented Dec. 22, 1959

2,918,500

TREATMENT OF BENZENE HEXACHLORIDE

Hoyt J. Cragg, Baton Rouge, La., assignor to Ethyl Corporation, New York, N.Y., a corporation of Delaware No Drawing. Application October 30, 1952
Serial No. 317,817

3 Claims. (Cl. 260—648)

This invention relates to the treatment of mixtures of benzene hexachloride (1,2,3,4,5,6 - hexachlorocyclohexane) and more particularly to a process for separating and recovering the various isomers thereof.

It is known that benzene hexachloride (BHC) occurs in a number of isomeric forms. For example, in the addition chlorination of benzene, a highly complex mixture results including at least five BHC isomers having approximately the following weight distribution: alpha, 65 percent; beta, 8 percent; gamma, 13 percent; delta, 10 percent; epsilon, less than 1 percent; and in addition, the several separate isomers of heptachlorocyclohexanes and other impurities. It is also known that the gamma isomer is by far the most insecticidally active BHC isomer. Accordingly, it is desirable to concentrate BHC isomer mixtures with respect to the gamma isomer to facilitate the preparation of improved insecticidal formulations by the elimination of inert isomers and odoriferous constituents thereof.

Prior methods for treating complex mixtures of BHC have not been entirely suitable. In general, most processes have included an extraction step wherein large quantities of the alpha isomer have been eliminated, and also a plurality of crystallization steps wherein the gamma isomer, or a large fraction thereof, is crystallized from a high delta isomer-containing mother liquor. The latter isomer is about twice as soluble in most solvents as the gamma isomer, but, since it is present in considerable quantities in crude BHC isomer mixtures, its presence limits the yields and recoveries attainable in such a process. In actual practice, about 35 percent of the original gamma isomer is lost due to the presence of the delta isomer, reducing the overall yield of the valuable gamma isomer to only about 8 pounds for each 100 pounds of crude BHC manufactured.

Purification of crude BHC is complicated considerably by the presence of the heptachlorocyclohexane isomers, the major isomer of which has solubility properties very similar to that of the gamma isomer in most common solvents, and also by the mutual solubility effects between the numerous isomers. These factors considerably complicate successful commercial use and operation of these prior extraction and crystallization processes.

It is accordingly an object of this invention to provide an improved process for treating BHC isomer mixtures, and particularly a process for the separation and isolation of selected isomers thereof. Another object is to provide a process in which selected BHC isomers can be recovered from complex BHC isomer mixtures containing heptachlorocyclohexanes and other impurities having solubility characteristics similar to the BHC isomers. Still another object of this invention is to provide a process in which BHC isomers, having solubility characteristics intermediate to other impurities in the same mixture, can be recovered in a minimum number of process steps. Other objects and advantages of this invention will become apparent as the description proceeds.

It has now been found that benzene hexachloride isomer mixtures can be easily and efficiently separated into two or more fractions so as to recover separate and selected isomers thereof, even when the crude mixture contains quantities of heptachlorocyclohexane isomers having solubility characteristics similar to those of the desired BHC isomers. Thus, the gamma isomer can be recovered from technical BHC or other isomer mixtures containing the gamma isomer, even though the gamma heptachlorocyclohexane isomer is present in the mixture, and in spite of the mutual solubility existent between the isomers.

The present invention covers a process for fractionating a mixture of benzene hexachloride isomers, comprising the steps of extracting the mixture simultaneously with two solvents for said isomers, which solvents are of a different type and under the conditions are at least partially immiscible with each other, thereby forming two separate phases in which the isomers are distributed in different proportions, separating the phases so-formed, further extracting the phase containing the major quantity of the gamma isomer and at least one additional isomer simultaneously with a pair of solvents, similar to the first-mentioned two solvents, thereby forming a second pair of separate phases in which the remaining isomers are distribtued in different proportions, the gamma isomer being recovered in the second extraction in a solvent of a different type than the solvent in which it was recovered in the first extraction.

To further illustrate the present invention, the separation of the isomers of BHC is accomplished in accordance with the present invention by extracting a mixture (for example, containing gamma isomer, in addition to isomers "X" and "Y") with an immiscible solvent pair, for instance, solvents L and P. The gamma isomer, along with isomer "X" is extracted by solvent L, and the isomer "Y" is extracted by solvent P. The solution of the gamma and "X" isomers and solvent L is then further extracted with a second pair of solvents L' and P', which solvents may or may not be the same as solvents L and P, respectively. In the latter extraction, the gamma isomer is separated from isomer "X" and is recovered in the solvent P'.

Preferably, the stream from the first extraction containing the gamma isomer is concentrated prior to being fed into the second extractor, such as by removal of some of the solvent. In general, it is desired for convenience to have the BHC isomer mixture feed dissolved in a solvent, but the quantity of latter solvent should preferably be considerably less than the quantity of corresponding solvent employed for extractive purposes. In some cases, particulaly when using high boiling solvents, it is convenient to feed the BHC mixture in a molten, solvent-free condition.

The present process can be conducted in a vertical extraction tower or column. The solvents employed in this case should have a sufficient difference in density to effect countercurrent flow by gravity. Using a vertical column, the lighter solvent is fed into the extraction column adjacent to the bottom thereof, whereas the heavier solvent enters near the top of the column. The feed BHC mixture is fed intermediate the ends, preferably near the center of the column.

The extraction column can be of a wide variety of designs. However, a column having a plurality of alternate mixing and separating stages or zones has been found highly satisfactory. For example, a vertical column having alternate zones providing agitation and mixing of the solvents with the BHC being extracted, and also alternate zones wherein the phases can separate in quiescence has given exceptional results.

While this gravity-flow operation is highly suitable, it is of course possible to effect diffusion and separation of the isomers into the two solvents by the use of a membrane or similar pervious partition.

One preferred apparatus for the present invention is a centrifugal separator, such as a centrifugal countercurrent extractor. The latter apparatus increases the efficiency of separation of the isomers, and permits the use of solvents having only slightly different densities. In addition, this apparatus eliminates or minimizes the formation of emulsions which are a problem when employing some solvent pairs, such as benzene and alcohols.

The isomer distribution of the BHC isomer mixture is not critical to the success of the present process. Crude BHC containing only about 15 percent of the gamma isomer, for example, can be effectively extracted. Likewise, equally good results can be obtained with high gamma isomer mixtures and/or high delta isomer mixtures. In consequence, this process if desired can be combined with a fractional extraction and crystallization process to recover all or a large part of the gamma isomer, or other isomers, normally lost in the high delta isomer mother liquor stream discussed above. This process is also useful in treating BHC isomer mixtures obtained by chlorinating benzene to a point of saturation of the gamma isomer in the benzene solution or by concentrating a benzene solution of BHC, wherein the alpha isomer is precipitated from the solution. In such cases, a benzene solution of BHC is obtained which is saturated with both the alpha and gamma isomers, but is unsaturated with respect to the delta isomer.

The solvent pairs suitable for the process of the present invention can be selected from a wide variety of compounds. However, in general, one of the solvents should be of a polar nature, whereas the second solvent should be of a non-polar nature. Typical polar solvents suitable with this invention include alcohols, such as methanol, ethanol, n-propanol, isopropanol, n-butanol, isobutanol, isohexanol, ethylene glycol; ethers, such as dioxane, diethylene glycol, diethylene glycol monoethyl ether, B,B′ oxydipropionitrile; and nitrated alkyl compounds, such as nitromethane.

Typical examples of non-polar solvents are as follows: straight or branched chain hydrocarbons, such as n-hexane, isohexane, n-heptane, isoheptane, n-octane, isooctane, n-decane, isodecane, cyclohexane; aromatic hydrocarbons, such as benzene, toluene, xylene, mesitylene; chlorinated hydrocarbons, such as perchlorethylene, chloroform, carbon tetrachloride, hexachlorobutadiene; fluorocarbons, such as perfluoromethyl cyclohexane, perfluoroheptane; and ethers, such as B,B′ dichloroethyl ether. In some cases, it has been found desirable to use the molten BHC mixture itself as the non-polar solvent in the first extraction step. Under these conditions, the molten BHC is flowed countercurrent to a polar solvent, such as ethylene glycol, and the isomer mixture so-obtained is subsequently extracted with another polar solvent (in some instances ethylene glycol) or with another solvent pair.

Any of the above solvents can be modified with other solvents or non-solvents to change the solubility characteristics of the solvent system. For example, instead of employing pure methanol as one of the solvents, in many cases it is preferred to employ aqueous methanol which has substantially lower solubility for the BHC isomers than anhydrous methanol. Likewise, petroleum ether or similar inert liquids can be added to hydrocarbon solvents to reduce or otherwise modify their dissolving power.

Any one of the above polar solvents can be combined with one or more of the non-polar solvents enumerated above, and vice versa to form an immiscible pair. The proportion or feed ratio of the solvents depends upon the solubility of BHC in the particular solvent pair, the isomer distribution in the BHC mixture, and also the particular technique which it is desired to employ in effecting the isomer separation. For example, in treating a BHC mixture containing the alpha, gamma and delta isomers, it is possible to extract in the first step either the alpha and gamma in one phase, or the gamma and delta in one phase. Therefore, the second extraction can be either extraction of the gamma isomer from the alpha isomer or, in the case of the second possibility, separation of the gamma and delta isomers. In the first case, substantially less solvent is employed for extracting the delta isomer alone than is required in the second case for extracting both the gamma and delta isomers.

The actual quantities or ratios of solvents to employ in the present process is not critical. For optimum results, however, the ratio of solvents should be selected to give the maximum recoveries of the desired product and the ratio will vary with the number of stages employed in the extraction unit, the isomer distribution of the feed, and the particular solvent system employed. Also, the position of feed in the extraction unit controls to some extent the optimum solvent ratio.

In general, the solvent ratio (R) should vary in accordance with the following equation if maximum separation is desired for both fractions, $$R = \frac{S_2}{S_1} = \frac{1}{\sqrt{D_X D_Y}}$$

wherein $S_1$ and $S_2$ are the immiscible solvents, $D_X$ is the concentration of isomer X in the first solvent/concentration of isomer X in the second solvent, and $D_Y$ is the concentration of isomer Y in the first solvent/concentration of isomer Y in the second solvent.

The use of a solvent ratio defined by the above equation will give only one product purity for any given number of stages in the separation unit. In many cases it is desired to operate at ratios other than that given by the above equation as "ideal." It is frequently desired to employ for economic reasons a minimum number of stages in the extraction unit, or to recover greater quantities of one of the valuable isomers at somewhat lower purities. In these instances solvent ratios other than the "ideal" are preferred. If a definite product purity or recovery is desired, with any one definite extraction unit (fixed number of plates), the optimum solvent ratio can be calculated by the following equation:

$$C_T = PC_O$$

wherein $C_T$ equals the product purity or, more specifically, the final ratio of one isomer to the other isomer (concentration of isomer X/concentration of isomer Y) in the final product; $C_O$ is the isomer concentration ratio in the initial or feed mixture; and P is the purification factor, i.e. the fractional recovery of isomer X/the fractional recovery of isomer Y in one solvent.

The purification factor for isomer X and Y, for example, can be determined from the following equation:

$$P = \frac{F_X}{F_Y}$$

wherein $F_X$ is the fractional recovery of isomer X, and $F_Y$ is the fractional recovery of isomer Y in one solvent.

The fractional recovery for any isomer is related to the extraction factor (E), the number of stages and the position of the feed plate as follows:

$$F_X = \frac{(E_X^{n'} - 1) E_X^{n+1}}{E_X^{N+1} - 1}$$

wherein N is the total number of plates and $n'$ is the number of plates below and including the feed plate, $n$ is the number of plates above the feed plates, and the extraction factor E equals the product of the distribution ratio (defined above) and the solvent ratio R, or for the isomer X:

$$E_X = R D_X$$

It should be apparent from the above that for any given extraction unit, and for a given product purity and recovery, the optimum solvent ratio for any solvent pair can be readily calculated.

The following are typical examples which illustrate the beneficial features of the present invention:

Example I

Crude benzene hexachloride is first extracted with methanol to obtain an extract having an isomer distribution as follows: gamma, 48 percent; alpha 16 percent; delta 26 percent and the remainder, the epsilon isomer and other impurities. This intermediate benzene hexachloride product is then fed into an extraction column containing 30 plates. This extraction is carried out at 30° C. The feed BHC enters at the middle of the column. A solution of 70 percent by weight of methanol and 30 percent by weight of water is passed into the top of the column and n-hexane enters at the bottom of the column. The feed rates are as follows: BHC, 31 parts by weight per minute; aqueous methanol, 17,380 parts by weight and n-hexane 3,650 parts by weight. The aqueous methanol solution is removed at the bottom of the column having the following composition: gamma, 59 percent; alpha, less than one percent; delta, 32 percent; and the remainder, other impurities. Approximately 97 percent of the gamma isomer is recovered in this fraction. The n-hexane fraction is recovered at the top of the column and has the following composition: gamma, 9.1 percent; alpha, 90 percent; and the remainder, other impurities.

Following the concentration of the gamma isomer-containing aqueous methanol solution, this solution is fed to a second column containing 10 plates, with the BHC-containing feed entering in the center of the column. The feed of n-hexane and aqueous methanol is 639 parts by weight and 1,169 parts by weight, respectively.

The aqueous methanol from the second column is recovered at the bottom thereof and has the following isomer distribution: gamma isomer, 2.4 percent; delta, 64.5 percent; and the remainder, other impurities. The n-hexane phase is recovered at the top of the column containing the gamma isomer in 98 percent purity. Approximately ½ of the remaining impurities is alpha isomer. The overall recovery of the gamma isomer in the two extraction steps is over 94 percent.

Example II

Example I is repeated except that the feed entered on the 20th plate from the bottom. In this example, the aqueous methanol phase recovered from the first extraction column contains 57 percent gamma isomer, 34 percent delta isomer, only two percent alpha isomer, and the remainder, other impurities. The n-hexane stream contains 23.4 percent gamma isomer, 76 percent alpha isomer and the remainder, other impurities.

The aqueous methanol solution is concentrated and fed to a second extractor as in Example I. In the latter extraction, the aqueous methanol solution contains only 7.1 percent gamma isomer, 75 percent delta isomer and the remainder, other impurities. The n-hexane stream contains above 99 percent gamma isomer. The overall recovery from the two extraction steps is 85 percent.

Example III

Example I is repeated except that the feed enters on the 25th plate from the bottom of the first extraction column. The aqueous methanol solution obtained at the bottom of the column contains 52 percent gamma isomer, only traces of alpha isomer, 38 percent delta isomer, and the remainder, other impurities. The aqueous methanol solution is then concentrated and fed to a second extractor. The methanol solution recovered at the bottom of the column contains 5.8 percent gamma isomer, 75.5 percent delta isomer, and the remainder, other impurities. The n-hexane fraction recovered at the top of the column contains above 99 percent gamma isomer. The overall recovery of the gamma isomer for the two extraction steps is 69 percent.

It will be seen from the above examples that by raising the feed point in the column, the gamma purity of the product can be increased, but in lower recoveries.

Example IV

Example I is repeated except that a column is employed having only 10 plates. The feed point again is at the center of the column. The rate of feed of the n-decane is 3,017 parts by weight per minute and the aqueous methanol 14,361 parts by weight per minute. The aqueous methanol solution obtained at the bottom of the column contains 51.5 percent gamma isomer, 5.8 percent alpha isomer, 34.5 percent delta isomer and the remainder, other impurities. The n-hexane stream recovered at the top of the column contains 54 percent alpha isomer, 45 percent gamma isomer, and the remainder, other impurities. Following concentration of the methanol solution, it is fed to a second column as in Example I, except that only 6 plates are employed. The feed plate is the top plate. The solvent feed in the second extraction is the same as that of Example I. The aqueous methanol solution recovered at the bottom of the column contains 12 percent gamma isomer, 70 percent delta isomer, and the remainder, other impurities. The n-hexane fraction contains 87 percent gamma isomer, 10 percent alpha isomer, and less than 3 percent delta isomer. The overall recovery of the gamma isomer in the two extraction steps is 78 percent.

Example V

Example IV is repeated, except that the feed plate in the second extraction is at the middle of the column. In this example, the product contains 86 percent gamma isomer. The overall recovery for the two extraction steps is 86 percent.

Example VI

Example I is repeated, except that the methanol solution contains only 10 percent water. In this example, the feed rates of n-hexane and aqueous methanol are 5,015 parts by weight per minute and 3,510 parts by weight per minute, respectively. The aqueous methanol solution recovered at the bottom of the first extraction column contains 57 percent gamma isomer, 2 percent alpha isomer, 32.8 percent delta isomer, and the remainder, other impurities. The n-hexane solution obtained from this extraction contains 21 percent gamma isomer, 78 percent alpha isomer, and the remainder, other impurities. The aqueous methanol solution is concentrated and fed to the second extractor employing the following feed rates: 908 parts by weight n-hexane per minute and 308 parts by weight aqueous methanol per minute. The aqueous methanol solution recovered in the bottom of the second extraction column contains 13 percent gamma isomer, 77 percent delta isomer, and the remainder, other impurities. The overall recovery of the gamma isomer in the two extraction steps is 81 percent.

Example VII

Example I is repeated, except that isohexane is employed instead of n-hexane. In this example the feed rates in the first extraction is 12,181 parts by weight per minute isohexane and 44,460 parts by weight per minute aqueous methanol, and, in the second extractor, 767 parts by weight per minute isohexane and 1,089 parts by weight per minute aqueous methanol. The aqueous methanol phase from the first extraction contains 48 percent gamma isomer, 7.1 percent alpha isomer, 26 percent delta isomer, and the remainder, other impurities. The isohexane phase contains 50 percent gamma isomer, 39 percent alpha isomer, and the remainder, other impurities. The aqueous methanol is then concentrated and fed to the second extraction column. The aqueous methanol solution recovered at the bottom of the column contains 1.4 percent gamma isomer, 79 percent delta isomer, and the remainder, other impurities. The isohexane fraction contains 87 percent gamma isomer, 13 percent alpha isomer and less than one percent delta isomer. The overall recovery of the gamma isomer in the two extraction steps is 70 percent.

*Example VIII*

Example I is repeated, except that cyclohexane is substituted for n-hexane. In this example, the rate of feed of the solvents is 1,113 parts by weight of cyclohexane per minute and 7,913 parts by weight of aqueous methanol per minute. The flow rates of the solvents in the second extraction are 224 parts by weight of cyclohexane per minute and 551 parts by weight of aqueous methanol per minute. The aqueous methanol solution obtained at the bottom of the first column contains 59 percent gamma isomer, less than one percent alpha isomer, 32 percent delta isomer, and the remainder, other impurities. The aqueous methanol solution so-obtained is then concentrated and fed to the second extractor. The aqueous methanol solution obtained therefrom contains 2.7 percent gamma isomer, 78 percent delta isomer, and the remainder, other impurities. The cyclohexane phase recovered from the top of the second extractor contains 99 percent gamma isomer. The overall recovery of the gamma isomer in the two extraction steps is 96 percent.

*Example IX*

A benzene hexachloride mixture containing 37 percent delta isomer, 26 percent gamma isomer, 11 percent alpha isomer, 5 percent beta isomer, 6 percent epsilon isomer, and approximately 15 percent heptachlorocyclohexanes is extracted in a column containing 20 plates. The benzene hexachloride mixture (100 parts by weight per minute) is fed to the middle of the column. Diethylene glycol is fed at the top of the column at the rate of 600 parts by weight per minute and n-decane is fed at the bottom of the column countercurrent to the diethylene glycol at the rate of 400 parts by weight per minute. The temperature of this extraction is 80° C. The n-decane fraction recovered at the top of the column contains about 81 percent alpha isomer and 19 percent gamma isomer. The diethylene glycol recovered at the bottom of the column contains 55.5 percent delta isomer, 35.6 percent gamma isomer, 2 percent alpha isomer and the remainder, other impurities. The diethylene glycol stream is then concentrated by the removal of solvent and fed into the center of a 10 plate extraction column. Diethylene glycol is fed to the top of this column at the rate of 600 parts by weight per minute and n-decane is fed countercurrent thereto into the bottom of the column at the rate of 780 grams per minute. The n-decane overhead product from the second extraction column contains 98 percent gamma isomer. The overall recovery of the gamma isomer in the two extraction steps is 82 percent. The diethylene glycol fraction recovered at the bottom of the second extractor contains 84 percent delta isomer and only 4.8 percent gamma isomer.

*Example X*

Example IX is repeated, except that the n-decane feed rate is increased to 425 parts by weight per minute. The n-decane overhead product contains 70 percent alpha isomer and approximately 30 percent gamma isomer. The diethylene glycol phase contains 58.5 percent delta isomer, 33.5 percent gamma isomer, less than one percent alpha isomer, and the remainder, other impurities. The diethylene glycol solution is then concentrated by removal of solvent and fed to a second extraction as in Example IX. Diethylene glycol is fed at the top of this column at the rate of 600 parts by weight per minute and n-decane is fed at the bottom of the column at the rate of 840 parts by weight per minute. The diethylene glycol phase contains 85 percent delta isomer, only 3 percent gamma isomer, and the remainder, other impurities. The n-decane phase recovered at the top of the column contains above 99 percent gamma isomer. The overall recovery of the gamma isomer in the two extraction steps is 77 percent.

*Example XI*

Example IX is repeated, except that tetralin is substituted for n-decane in the second extraction operation. In this example, the tetralin is fed countercurrent to the diethylene glycol at the rate of 150 parts by weight per minute. The diethylene glycol phase from the second extraction column contains 78 percent delta isomer, 13.4 percent gamma isomer and the remainder, other impurities. The tetralin phase contains 93 percent gamma isomer. The latter isomer recovery over the two extraction steps is 66 percent.

*Example XII*

Example IX is repeated, except that B,B' oxydipropionitrile is substituted for diethylene glycol. The feed rates of the solvents are 770 parts by weight per minute of B,B' oxydipropionitrile and 1,620 parts by weight per minute of n-decane. The n-decane fraction recovered at the top of the extractor contains 32.5 percent gamma isomer and approximately 67.5 percent alpha isomer. The B,B' oxydipropionitrile fraction contains 58.8 percent delta isomer, 32 percent gamma isomer, less than 1 percent alpha isomer, and the remainder, other impurities. The B,B' orydipropionitrile fraction is then concentrated by removal of solvent and fed as in Example IX to the center of a second extractor. B,B' oxydipropionitrile is fed into the top of the column at a rate of 770 parts by weight per minute and, countercurrent thereto, n-decane is fed at the bottom of the column at the rate of 3,310 parts by weight per minute. The B,B' oxydipropionitrile fraction recovered at the bottom of the column contains 86 percent delta isomer, less than 3 percent gamma isomer, and the remainder, other impurities.

In the above example, the gamma isomer has been first separated from the alpha isomer and thereafter separated from the delta isomer and other impurities. In all of the examples disclosed above, the process steps could be reversed to first extract or separate the gamma and delta isomer and thereafter separate the gamma isomer from the relatively insoluble alpha isomer.

The examples given above demonstrate the effect of different solvents on the gamma isomer purity and recovery. When these solvents are substitutd by any of the other solvents disclosed hereinbefore, similar results are obtained. Thus, the n-hexane can be replaced by n-heptane, isoheptane, n-octane, isoöctane, isodecane, benzene, toluene, xylene, acetylene, perchlorethylene, chloroform or carbon tetrachloride while obtaining corresponding and similar results. Likewise, the methanol can be substituted with ethanol, n-propanol, isopropanol, n-butanol and the like.

As shown in Example XI above, it is not necessary to employ the same solvent pair in the first and second extraction steps. In fact, the solvent pair in the second extraction may be entirely different from those employed in the first extraction. However, for convenience, it is normally preferred to use the same solvent in the second extraction step as that which dissolves the major quantities of the gamma isomer in the first extraction.

As is believed apparent from the foregoing, the present invention provides a convenient, simplified and efficient method for separating the several isomers of BHC, and for recovering, when desired, such isomers in essentially pure form. It is not to be expected that stereo-isomers, such as BHC isomers, could be separated using countercurrent extraction techniques, and particularly that an isomer could be isolated in high purity and recoveries when it has solubility characteristics intermediate and very similar to those of other impurities therein. However, the present process permits the recovery of extremely pure gamma isomer products in exceedingly high yields from highly complex BHC isomer mixtures containing the same. Accordingly, the present process can be used to treat the "crude" reaction product of benzene chlorination, or can be employed to treat other mixtures in which the isomer distribution has been altered. In addition to the treatment of crude BHC directly by the liquid-liquid extraction technique of this invention, the crude mixture can be first extracted with a solvent, such as methanol, and the extract so-obtained processed in accordance with the present invention. Likewise, the extract so-obtained can be first crsytallized to obtain further purification of the gamma isomer, and thereafter extracted by the process disclosed herein to effect additional purification, such as in the production of "lindane." Also, after extraction and crystallization of BHC mixtures with a selected solvent, the mother liquor from such crystallization (normally containing a high concentration of the delta and gamma isomers) can be treated by the present process to effect separation of the isomers therein.

I claim:

1. A process for preparing compositions containing benzene hexachloride which comprises establishing a zone containing a pair of oppositely moving streams of immiscible benzene hexachloride solvents; one of said streams comprising a solvent selected from the group consisting of alcohols, glycols, dioxanes and nitrated alkyl compounds and the second stream comprising a solvent selected from the group consisting of hydrocarbons, chlorinated hydrocarbons and B,B'-dichloroethyl ether, introducing an isomeric mixture of benzene hexachloride including the gamma and delta isomers into the zone to cause benzene hexachloride to dissolve in and become partitioned between the two solvents, the gamma isomer selectively distributing in the said second solvent.

2. A method of preparing compositions containing benzene hexachloride which comprises establishing a zone containing a pair of oppositely moving streams of immiscible benzene hexachloride solvents, one of said streams comprising methanol and the other comprising n-hexane, introducing an isomeric mixture of benzene hexachloride including the gamma and delta isomers into the zone to cause said benzene hexachloride to dissolve in and become partitioned between the two solvents, the gamma isomer selectively distributing in the n-hexane.

3. A method of preparing compositions containing benzene hexachloride which comprises establishing a zone containing a pair of oppositely moving streams of immiscible benzene hexachloride solvents, one of said streams comprising methanol and the other comprising cyclohexane, introducing an isomeric mixture of benzene hexachloride including the gamma and delta isomers into the zone and dissolving said benzene hexachloride in the solvents, the gamma isomer selectively distributing in the cyclohexane.

References Cited in the file of this patent

UNITED STATES PATENTS 2,023,109    Van Dijck _____ Dec. 3, 1935

OTHER REFERENCES

Slade: "Chemistry and Industry," October 13, 1945, pages 314–319.